United States Patent [19]

North

[11] 4,099,980
[45] Jul. 11, 1978

[54] PROCESS FOR PRODUCING GAMMA QUINACRIDONE SOLID SOLUTIONS

[75] Inventor: Robert Jarl North, Elmwood Park, N.J.

[73] Assignee: Harmon Colors Corporation, New York, N.Y.

[21] Appl. No.: 759,691

[22] Filed: Jan. 17, 1977

Related U.S. Application Data

[63] Continuation-in-part of Ser. No. 643,443, Dec. 22, 1975, abandoned, which is a continuation-in-part of Ser. No. 518,558, Oct. 29, 1974, abandoned.

[51] Int. Cl.$^2$ .............................................. C09B 48/00
[52] U.S. Cl. ........................ 106/288 Q; 260/279 QA
[58] Field of Search ............. 260/279 QA; 106/288 Q

[56] References Cited

U.S. PATENT DOCUMENTS

| | | | |
|---|---|---|---|
| 3,257,405 | 6/1966 | Gerson et al. | 260/279 QA |
| 3,265,699 | 8/1966 | Jaffe | 260/279 QA |
| 3,287,147 | 11/1966 | Wilkinson | 106/288 Q |

FOREIGN PATENT DOCUMENTS

47-17,149  5/1972  Japan.

*Primary Examiner*—Donald G. Daus
*Assistant Examiner*—Diana G. Rivers
*Attorney, Agent, or Firm*—Plumley and Tyner

[57] ABSTRACT

A method is provided for the production of gamma quinacridone solid solutions which comprises ring-closing a mixture comprising 80–99 weight percent of dianilinoterephthalic acid and 1–20 weight percent of di(ortho-substituted) anilinoterephthalic acid, 4,11-disubstituted quinacridone, or mixtures thereof, and drowning the product into a water miscible alcohol containing from 1 to 3 carbon atoms.

7 Claims, No Drawings

PROCESS FOR PRODUCING GAMMA QUINACRIDONE SOLID SOLUTIONS

BACKGROUND OF THE INVENTION

This Application is a continuation-in-part of copending application Ser. No. 643,443 filed Dec. 22, 1975 now abandoned, which is a continuation-in-part of Ser. No. 518,558, filed Oct. 29, 1974, now abandoned.

This invention relates to quinacridone pigments. More particularly this invention relates to a process for producing quinacridone solid solutions which are comprised of the gamma crystalline phase of unsubstituted quinacridone (hereinafter termed gamma quinacridone).

Linear quinacridone is represented by the structure

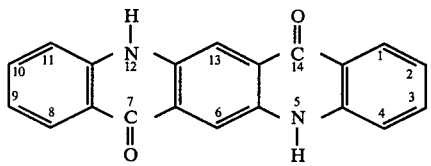

and, as is disclosed in U.S. Pat. No. 2,844,581, exists in a number of crystalline phases, including the alpha phase, the beta phase and the gamma phase.

Recently, gamma quinacridone has found a ready market in the automotive and architectural industries in view of the fact that this pigment produces a deep red metallic finish in the quinacridone color region. Heretofore, gamma quinacridone has been produced commercially from quinacridone by milling quinacridone after it is produced by oxidation of dihydroquinacridone. Note U.S. Pat. No. 2,844,581. Other patents in this same general area are U.S. Pat. Nos. 3,160,510; 3,257,405 and 3,342,823. The milling of quinacridone to produce the gamma quinacridone pigment is, of course, an additional step in the production of the pigment and requires additional energy input, time, equipment, etc.

It is an object of this invention to produce gamma quinacridone solid solutions directly from the ring closure of a mixture of dianilinoterephthalic acid and di-(ortho-substituted) anilinoterephthalic acid, 4,11-disubstituted quinacridone, or mixtures thereof. This and other objects will become apparent from the description which follows.

SUMMARY OF THE INVENTION

In accordance with this invention there is provided a process for producing gamma quinacridone solid solutions which comprises heating, at a temperature between 80-120° C., a mixture comprising 80-99 weight percent of dianilinoterephthalic acid and 1-20 weight percent of di-(ortho-substituted) anilinoterephthalic acid, 4,11-disubstituted quinacridone, or mixtures thereof, in the presence of polyphosphoric acid and thereafter recovering the gamma quinacridone solid solution by the addition of the mixture to a water miscible alcohol containing from 1 to 3 carbon atoms.

When operating in accordance with the present invention, i.e., the ring closure of dianilinoterephthalic acid in the presence of di-(ortho-substituted-)anilinoterephthalic acid, 4,11-disubstituted quinacridone, or mixtures thereof, it has been found that the product produced by the drowning, i.e., diluting, into the water miscible alcohol, is a gamma quinacridone solid solution, i.e., exhibits an X-ray diffraction pattern consistent with that generally recognized as identifying the gamma crystalline form of unsubstituted quinacridone. Thus, the process of the present invention provides a process for the direct production of pigmentary gamma quinacridone solid solutions and eliminates the need for any extra step for the production of this crystalline phase of the quinacridone pigment.

DETAILED DESCRIPTION OF THE INVENTION

The gamma quinacridone solid solution pigments produced by the process of the present invention have excellent outdoor durability and are useful in coloring automotive finishes, inks and house paints. They are particularly valuable in preparing red architectural finishes and transparent automotive metallic finishes.

The process of the present invention provides a simple economic route to gamma quinacridone solid solutions which eliminates the need for certain operations heretofore employed in the production of solid solutions exhibiting the unsubstituted gamma crystalline phase of quinacridone. Furthermore, it is quite unexpected that the process of the present invention would produce gamma quinacridone solid solutions inasmuch as present quinacridone technology would ordinarily predict that drowning a polyphosphoric acid solution of ring-closed unsubstituted quinacridone containing 1-20 parts by weight, based on the weight of the unsubstituted quinacridone, of ring-closed 4,11-disubstituted quinacridone into a water miscible alcohol containing from 1 to 3 carbon atoms would produce the violet, beta phase type of quinacridone. It has been found, however, that this is not the case and that by operating within the confines of the present invention the quinacridone solid solution produced exhibits a gamma type of X-ray pattern, in admixture with the 4,11-disubstituted quinacridone.

In carrying out the process for the present invention, the dianilinoterephthalic acid is mixed with 1-20 weight percent of di(ortho-substituted) anilinoterephthalic acid, 4,11-disubstituted quinacridone, or mixtures thereof, and dissolved in polyphosphoric acid, in which dianilinoterephthalic acid is ring closed to unsubstituted quinacridone and di-(ortho-substituted) anilinoterephthalic acid is ring closed to 4,11-disubstituted quinacridone. The use of polyphosphoric acid as a ring closing agent is well known in the quinacridone art as exemplified by U.S. Pat. Nos. 3,257,405 and 3,342,823. As indicated in the prior art, the polyphosphoric acid should have an acid content ($H_3PO_4$) of at least 100 percent. Preferably, the polyphosphoric acid strength is between 114-120 percent. This mixture is heated while being stirred at a temperature of above 70° C., preferably within the range of 80° to 120° C. After the ring closure has been accomplished, which usually requires from 4-16 hours, the mixture is diluted, after being cooled to below 100° C., by adding the mixture to a water miscible alcohol containing from 1 to 3 carbon atoms. The addition to the alcohol results in a slurry which is then heated at reflux, drowned into water, filtered, washed acid free, boiled with caustic soda to remove traces of acid, filtered, washed alkali free and dried to yield a solid solution of red solid gamma phase quinacridone pigment in admixture with 4,11- disubstituted quinacridone.

The addition of the polyphosphoric acid solution to the alcohol, rather than the reverse order of drowning, i.e., the alcohol added to the acid solution, is extremely important in the process of the present invention since it produces easily reproducible results. Furthermore, this order of addition results in a process which is non-dependent on time or temperature. Either slow (e.g., 30 minutes) or fast (e.g. 3 minutes) addition of the acid solution to the alcohol gives identical results. Ambient temperatures as well as elevated temperatures are equally effective as long as alcohol is not allowed to substantially vaporize out of the reaction mixture.

The alcohol useful in the process of the present invention results in the production of extremely attractive quinacridone shades. Among those which may be mentioned are alcohols such as methanol, ethanol, isopropanol, glycerol, ethylene glycol propylene glycol or the like. Preferably, an alcohol containing from 1 to 3 carbon atoms is employed as the water miscible alcohol into which the mixture is drowned since alcohols which are either water-immiscible or contain more than 3 carbon atoms tend to yield mixtures of beta and gamma unsubstituted quinacridones. Methanol is preferably employed in the process. Water in amounts up to about 2% in the alcohol does not adversely affect the results.

As has been indicated above, the amount of di-(ortho-substituted) anilinoterephthalic acid, 4,11-disubstituted quinacridone, or mixtures thereof used is between 1–20 weight percent of the dianilinoterephthalic acid starting material, which is present in 80–99 weight percent of the entire mixture. Preferably, the substituted material is present in an amount between 1–10 weight percent. Amounts higher than 20 percent result in a product which has a significant change in its X-ray diffraction pattern indicating that the gamma quinacridone is not being produced as desired. By dianilinoterephthalic acid is meant 2,5-dianilinoterephthalic acid as used herein and by "orthosubstituted" dianilinoterephthalic acid is meant substitution at the ortho positions on the aniline rings in the 2,5-dianilinoterephthalic acid which when ring closed produces 4,11-disubstituted quinacridone. Halogen substituents, i.e., chlorine, fluorine, bromine and iodine, especially chlorine, are the preferred substituents in accordance with the present invention. Other exemplary substituents which may be mentioned are alkyl, i.e., methyl, ethyl, propyl and butyl, preferably methyl; alkoxy, i.e., methoxy, ethoxy, propoxy, butoxy and preferably methoxy; halogenated alkyls, that is, mono-, di- and tri- halogenated alkyl containing 1 to 4 carbon atoms such as chloromethyl and trifluoromethyl; and carboalkoxy containing 1 to 4 carbon atoms, such as carbomethoxy and carboethoxy. Substitution other than diortho, such as para or meta, on the aniline rings in disubstituted anilino terephthalic acid or other than 4,11-disubstitution in the disubstituted quinacridone does not produce the desired result. Mixtures of substituted materials can be used such that the mixture constitutes 1–20 weight percent of dianilinoterephthalic acid, e.g. di-(ortho-chloro)- and di-(ortho-methyl) anilinoterephthalic acids, 4,11-dichloroquinacridone and di-(ortho-chloro)-anilinoterephthalic acid, and 4,11-dichloroquinacridone and di-(ortho-methyl)anilinoterephthalic acid.

DESCRIPTION OF PREFERRED EMBODIMENTS

The following examples are given by way of illustration only.

EXAMPLE I 26.9 parts of dianilinoterephthalic acid and 1.0 part of di-(ortho-chloro)-anilinoterephthalic acid are added to 195 parts of polyphosphoric acid having an acid strength of 118 percent. The mixture is heated at 102° – 105° C. for 16 hours and thereafter cooled to 90° C. The cooled mixture is poured into 375 parts of methanol at 35° C. The resulting slurry is refluxed for 1 hour and then poured into 600 parts of water, heated to 60° C. for 30 minutes and thereafter filtered, washed acid free and reslurried with 75 parts of 50 percent sodium hydroxide and 1500 parts of water and boiled for 1 hour. After filtering and washing alkali free, the wet press cake is slurried in 750 parts water at a pH of between 3 and 3.5 with dilute HCl and heated at 75° C. for 30 minutes. Filtration, washing acid free and drying at 180° F. overnight yields 24 – 25 grams of a red solid with an X-ray pattern essentially of gamma quinacridone in admixture, as a solid solution, with 4,11-dichloroquinacridone. (All parts indicated are by weight unless otherwise designated.)

EXAMPLE II

The procedure of Example I was repeated with the exception that 2.7 parts of 2,9-di-(para-chloro-)-anilinoterephthalic acid was employed in place of the di-(ortho-chloro)anilinoterephthalic acid. The resulting product was the violet, beta quinacridone in admixture with the 2,9-dichloroquinacridone.

What is claimed is:

1. A process for producing quinacridone solid solutions exhibiting essentially the X-ray diffraction pattern of unsubstituted gamma quinacridone which comprises heating, at a temperature between 80°–120° C., a mixture comprising 80–99 weight percent of dianilinoterephthalic acid and 1–20 weight percent of di-(orthosubstituted) anilinoterephthalic acid, 4,11-disubstituted quinacridone, or mixtures thereof, in the presence of polyphosphoric acid and thereafter diluting the reaction mixture by adding the mixture to a water miscible alcohol containing from 1 to 3 carbon atoms and recovering the precipitated gamma quinacridone solid solution, and wherein the substituents on the di-(ortho-substituted) anilinoterephthalic acid or 4,11-disubstituted quinacridone are halogens, alkyl of 1 to 4 carbon atoms, alkoxy of 1 to 4 carbon atoms, halogenated alkyl of 1 to 4 carbon atoms or carboalkoxy of 1 to 4 carbon atoms.

2. The process as defined in claim 1 wherein the di-(ortho-substituted) anilinoterephthalic acid, 4,11-disubstituted quinacridone, or mixtures thereof, is present in an amount between 1–10 weight percent and the dianilinoterephthalic acid is present in an amount between 90–99 weight percent.

3. The process as defined in claim 1 wherein the alcohol is methanol.

4. The process of claim 1 wherein the mixture comprises dianilinoterephthalic acid and di-(ortho-chloro)anilinoterephthalic acid.

5. The process of claim 1 wherein the mixture comprises dianilinoterephthalic acid and 4,11-dichloroquinacridone.

6. The process of claim 1 wherein the mixture comprises dianilinoterephthalic acid and di-(ortho-methyl)-anilinoterephthalic acid.

7. The process of claim 1 wherein the mixture comprises dianilinoterephthalic acid and 4,11-dimethylquinacridone.

* * * * *